United States Patent
Holman et al.

(10) Patent No.: US 12,460,751 B2
(45) Date of Patent: Nov. 4, 2025

(54) COMPOSITE PIPE END-FITTING

(71) Applicant: MAGMA GLOBAL LIMITED, Portsmouth (GB)

(72) Inventors: Daniel Clement Holman, Southampton (GB); Fred William Merchant, Portchester (GB)

(73) Assignee: MAGMA GLOBAL LIMITED (GB)

( * ) Notice: Subject to any disclaimer, the term of this patent is extended or adjusted under 35 U.S.C. 154(b) by 0 days.

(21) Appl. No.: 18/294,979

(22) PCT Filed: Jul. 21, 2022

(86) PCT No.: PCT/GB2022/051896
§ 371 (c)(1),
(2) Date: Feb. 2, 2024

(87) PCT Pub. No.: WO2023/012453
PCT Pub. Date: Feb. 9, 2023

(65) Prior Publication Data
US 2025/0012386 A1 Jan. 9, 2025

(30) Foreign Application Priority Data
Aug. 4, 2021 (GB) .................................... 2111283

(51) Int. Cl.
*F16L 19/02* (2006.01)
*F16L 23/028* (2006.01)
(Continued)

(52) U.S. Cl.
CPC ........... *F16L 19/0206* (2013.01); *F16L 47/14* (2013.01); *F16L 23/0286* (2013.01); *F16L 47/04* (2013.01)

(58) Field of Classification Search
CPC ... F16L 23/0286; F16L 19/0206; F16L 47/14; F16L 33/01; F16L 47/04; F16L 33/28
See application file for complete search history.

(56) References Cited

U.S. PATENT DOCUMENTS

| 11,402,038 B2 * | 8/2022 | Charlesworth ......... F16L 33/01 |
| 2009/0085351 A1 | 4/2009 | Cloos et al. |

(Continued)

FOREIGN PATENT DOCUMENTS

| EP | 2492571 A2 | 8/2012 |
| FR | 1869218 U | 3/1963 |

(Continued)

OTHER PUBLICATIONS

International Search Report mailed Dec. 2, 2022 in corresponding PCT International Application No. PCT/GB2022/051896.

(Continued)

*Primary Examiner* — William S. Choi
(74) *Attorney, Agent, or Firm* — OSTROLENK FABER LLP

(57) ABSTRACT

A composite pipe termination that includes: a) a composite pipe having an interior pipe surface, an exterior pipe surface, a pipe end and a liner; b) an annular portion of composite material attached to the exterior pipe surface, the annular portion having a first stepped region in which the annular portion decreases in radial thickness in the axial direction away from the pipe end by at least one step; c) an annular collar enclosing the first stepped region; d) an end-fitting interfacing with the annular portion and locked to the annular collar. The annular collar has a stepped portion in which the annular collar increases in radial thickness in the axial direction away from the pipe end by the same number of steps as in the first stepped region. The steps of the stepped portion mate with steps of the first stepped region.

16 Claims, 4 Drawing Sheets

(51) Int. Cl.
*F16L 47/04* (2006.01)
*F16L 47/14* (2006.01)

(56) References Cited

U.S. PATENT DOCUMENTS

| | | | |
|---|---|---|---|
| 2015/0048611 A1 | 2/2015 | Shanks, II et al. | |
| 2015/0204472 A1* | 7/2015 | Roberts | F16L 47/04 |
| 2017/0299092 A1* | 10/2017 | Larsen | F16L 33/01 |
| 2018/0297292 A1* | 10/2018 | Batten | F16L 33/28 |
| 2019/0101233 A1* | 4/2019 | Hatton | F16L 47/14 |
| 2020/0207008 A1* | 7/2020 | Vernon-Harcourt | |

FOREIGN PATENT DOCUMENTS

| | | |
|---|---|---|
| FR | 2095625 A5 | 2/1972 |
| GB | 2439146 A | 12/2007 |
| WO | WO 2017/163021 A1 | 9/2017 |
| WO | WO 2021/102329 A1 | 5/2021 |

OTHER PUBLICATIONS

International Written Opinion mailed Dec. 2, 2022 in corresponding PCT International Application No. PCT/GB2022/051896.

* cited by examiner

COMPOSITE PIPE END-FITTING

FIELD OF THE INVENTION

The invention relates to a composite pipe termination for use in the oil and gas industry, such as in subterranean and sub-sea locations, and a method of providing a composite pipe termination.

DESCRIPTION OF THE RELATED ART

Subsea oil and gas drilling and development employs pipes to transport liquid and/or gaseous hydrocarbons from the seabed to the sea surface and to transport injection fluids from the surface to the seabed. These pipes have typically been made from steel or from unbonded layers of materials, such as one or more layer(s) of steel wires combined with a plastic liner, which together form a flexible, unbonded steel pipe. Such unbonded, flexible pipes are covered by American Petroleum Institute standard API 17J.

Over time, the subsea depths at which hydrocarbons are extracted has tended to increase. This development has been accompanied by a need to operate under harsher conditions including one or more of conditions of increased salinity, higher acidity, higher internal and external pressures and higher temperatures. In order to address these challenges, the industry has turned to composite pipes, comprising fibre-reinforced thermoplastic polymer. Reference may be made to WO 2012/072993 A1 which discloses such composite pipes. These pipes may be manufactured by winding tapes of composite material onto a pipe liner and fusing them thereto, then winding further layers of tape on top and fusing each layer to the immediately preceding layer. The composite material typically comprises a thermoplastic matrix, such as polyether ether ketone, with fibres embedded therein and the liner is typically made of the same thermoplastic material as the matrix. These pipes are lighter and better able to withstand the more severe environments as well as the more complex dynamic loading conditions including tension, bending and internal/external pressure found deep below the sea surface. DNV standard DNVGL-ST-F119 (August 2018) relates to thermoplastic composite pipes for offshore applications in the oil and gas industry.

An obstacle to the introduction of such composite pipes has been the ability to effectively terminate such pipes and to reliably connect them to non-composite, especially steel, piping and apparatus at both subsea and surface interfaces. Composite pipe terminations and connections must be able to provide a reliable transition from the composite pipe material to a standard steel pipe, which may typically incorporate a steel flange or hub connection. The different structural properties of the two materials on the one hand and the differences in thermal expansion on the other, may make it challenging to effect both a reliable structural and sealing connection. Reference may also be made to WO 2012/095633 A1 and WO 2017/163021 A1, which disclose prior art end-fittings for a composite pipe.

There is a need to improve composite pipe terminations, such that they may reliably be connected to metal piping. In particular, there is a need to improve the seal achieved by the composite pipe termination and to improve its ability to resist axial and torsional forces. In addition, it is desirable for the diameter of the pipe termination to be kept small so that it is not significantly larger than the diameter of the pipe.

For completeness, pipe end-fittings are also known from GB 2 439 146 A, EP 2 492 571 A2 and US 2014/0312612 A1. These documents relate to flexible steel, unbonded pipe of the type discussed above. Although such flexible pipes may comprise multiple layers including steel and polymer layers, the pipes are, at heart, steel pipes and not composite pipes as presently defined. As a result of these pipes being fundamentally steel pipes, the problems of providing an end-fitting to a composite pipe do not arise. The end-fitting generally comprises a steel flange, which is attached to the underlying steel carcass of the flexible steel, unbonded pipe. This is a metal-to-metal connection, so the challenges which may arise when attaching a steel end-fitting to a composite pipe do not occur.

It is against this background that the present invention has been devised.

SUMMARY OF THE INVENTION

According to a first aspect of the invention, a composite pipe termination is provided, comprising:
a) a composite pipe formed of composite material and having an interior pipe surface, an exterior pipe surface and a pipe end, wherein composite material is a material comprising a polymer matrix and a plurality of reinforcing fibres embedded in the polymer matrix;
b) a liner, wherein the interior pipe surface is fused to the liner;
c) an annular portion of composite material attached to the exterior pipe surface, the annular portion comprising a first stepped region in which the annular portion decreases in radial thickness in the axial direction away from the pipe end by means of at least one step;
d) an end-fitting which interfaces with the annular portion;
e) an annular collar enclosing the first stepped region;
f) locking means which lock the end-fitting to the annular collar to prevent the end-fitting from moving axially with respect to the annular collar;
wherein the annular collar comprises a stepped portion in which the annular collar increases in radial thickness in the axial direction away from the pipe end by means of the same number of steps as are comprised in the first stepped region, wherein step(s) of the stepped portion mate with step(s) of the first stepped region to prevent or limit axial movement of the annular collar towards the end-fitting.

As used herein, the term "axial" refers to the axis of the composite pipe, which extends longitudinally along the composite pipe.

As used herein, the term "step" refers to an abrupt change of radial thickness.

As used herein, the term "end-fitting" means a device intended to attach to another apparatus, such as a pipe, or an end cap, and may comprise a flange, hub or the like.

According to the first aspect of the invention, step(s) of the stepped portion mate with step(s) of the first stepped region to prevent or limit axial movement of the annular collar towards the end-fitting. For the case in which the stepped portion and the first stepped region each only comprise one step, then the single step of the stepped portion mates with the single step of the first stepped region to prevent axial movement of the annular collar towards the end-fitting. For the case in which the stepped portion and the first stepped region each comprise more than one step, then it may be advantageous if not all steps are manufactured exactly to mate with one another, such that there is a gap between at least one step of the stepped portion and at least one corresponding step of the first stepped region. The gaps need not all be of a uniform size. There may, in addition, be a gap along at least a portion of the interface between the annular portion and the annular collar between the steps. These gap(s) too need not all be of a uniform size. Having an arrangement in which one or more step(s) of the stepped portion do not exactly mate with one or more of the corresponding steps of the first stepped portion, may allow the stresses which occur in use at high pressure and/or high temperature to be smoothed out as the pipe expands. In the expanded, in-use state, it is typically the case that all step(s) of the stepped portion mate with all step(s) of the first stepped region to prevent axial movement of the annular collar towards the end-fitting, notwithstanding the presence of gaps prior to use which may allow limited axial movement. The magnitude of any gaps present would be determined by the skilled person based upon factors such as the diameter of the pipe (the annular portion and the collar), the intended in-use pressures and temperatures and the materials and coefficients of thermal expansion of the annular portion, the pipe and the annular collar.

According to an embodiment of the first aspect, the first stepped region and the stepped portion each comprises from 1 to 5 steps, preferably from 2 to 5 steps.

According to another embodiment of the first aspect, the step or each step has a dimension in the radial direction which is from 5% to 20% of the internal diameter of the composite pipe. In the case in which there is more than one step, then one or more step(s) may have a different radial dimension to one more other steps(s).

According to a further embodiment of the first aspect, the step or each step is provided at an angle from 0 degrees to 45 degrees, preferably 0 degrees to 30 degrees, more preferably 0 degrees to 15 degrees to a plane orthogonal to the axial direction, such that steps may be angled towards the end-fitting. In the case in which there is more than one step, then one or more step(s) may be provided at a different angle (to a plane orthogonal to the axial direction) to one more other steps(s).

According to another embodiment of the first aspect the annular portion comprises a second stepped region in which the annular portion decreases in radial thickness in the axial direction towards the end-fitting by means of one or more steps. According to this embodiment of the first aspect, the second stepped region may terminate beyond the pipe end.

Further, according to this embodiment of the first aspect, the end-fitting may comprise:
a. a first interface which sealingly engages with the second stepped region;
b. a second interface for interfacing with another apparatus;
c. an intermediate region which connects the first interface to the second interface, wherein the intermediate region has a diameter which is smaller than the diameter of the first interface;
d. wherein the first interface comprises a stepped surface which increases in radial thickness in the axial direction towards the annular portion and comprises steps which mate with steps of the second stepped region.

Without wishing to be bound by theory, the presence of steps which sealing engage with the first interface may serve to distribute stress at the interface better than a planar interface would, thereby avoiding undesirable stress concentration, which may reduce the effectiveness of the seal.

According to one alternative:
a. The annular collar comprises a locking portion which extends beyond the first interface;
b. the locking portion comprises an inner surface which is provided with a female thread;
c. the end-fitting comprises an outer surface which is provided with a male thread;
d. the male thread on the outer surface of the end-fitting engages with the female thread of the locking portion to lock the end-fitting to the annular collar and prevent the end-fitting from moving axially with respect to the annular collar.

According to another alternative:
a. The annular collar comprises a locking portion which extends beyond the first interface, such that the locking portion overlaps part of the intermediate region and is radially spaced therefrom by an annular locking space;
b. the locking portion comprises an inner surface which is provided with a female thread;
c. the locking means comprises a locking ring having an external surface provided with a male thread; and
d. the male thread of the locking ring engages with the female thread of the locking portion to lock the locking ring within the annular locking space and prevent the end-fitting from moving axially with respect to the annular collar.

According to one embodiment of the first aspect, the liner comprises an extension portion which extends beyond the pipe end. According to this embodiment, the end-fitting may comprise a receiving portion formed to receive a portion of the extension portion and form a lip seal, wherein, in use, the lip seal is pressed against the receiving portion by the pressure of fluid contained within the pipe termination to enhance the seal.

According to another embodiment of the first aspect, a first sealing element is provided between the second stepped region, the first interface and the annular collar. The first sealing element may consist of thermoplastic polymer. The first sealing element may comprise PEEK and may consist of PEEK.

According to a further embodiment of the first aspect, a second sealing element is provided between the annular portion, the first interface, the pipe end and the extension portion. The second sealing element may consist of thermoplastic polymer. The second sealing element may comprise PEEK and may consist of PEEK.

According to one embodiment of the first aspect, the end-fitting, the collar and the locking ring are made of metal and are preferably made of steel.

According to another embodiment of the first aspect, the end-fitting comprises a flange.

According to a further embodiment of the first aspect, the polymer matrix comprises thermoplastic polymer and may consist of thermoplastic polymer. The polymer matrix may consist of PEEK.

According to one embodiment of the first aspect, wherein the reinforcing fibres comprise glass fibres, carbon fibres, or mixtures thereof.

According to another embodiment of the first aspect, the composite pipe comprises wound tapes of composite material which have been fused together and wherein the polymer matrix consists of thermoplastic polymer. According to this embodiment, the reinforcing fibres may be continuous (that is unbroken) along the entire length of the tapes.

According to a further embodiment of the first aspect, the liner comprises thermoplastic polymer and may consist of thermoplastic polymer. The liner may consist of PEEK.

According to another embodiment of the first aspect, the annular portion consists of a composite material which is the same as the composite material of which the composite pipe consists.

According to a second aspect of the invention, a method of providing a composite pipe termination is provided, the method comprising:
  a) providing a composite pipe formed of composite material and having an interior pipe surface, an exterior pipe surface and a pipe end, wherein composite material is a material comprising a polymer matrix and a plurality of reinforcing fibres embedded in the polymer matrix; and wherein the interior pipe surface is fused to a liner;
  b) attaching an annular portion of composite material to the exterior pipe surface;
  a) providing the annular portion with a first stepped region in which the annular portion decreases in radial thickness in the axial direction away from the pipe end by means of one or more steps;
  c) providing:
    i. an annular collar comprising a stepped portion in which the annular collar increases in radial thickness in the axial direction away from the pipe end by means of the same number of steps as are comprised in first stepped region;
    ii. an end-fitting which interfaces with the annular portion;
    iii. locking means which lock the end-fitting to the annular collar to prevent the end-fitting from moving axially with respect to the annular collar;
  d) arranging the annular collar around the annular portion to enclose the first stepped portion such that step(s) of the stepped portion mate with step(s) of the first stepped region to prevent or limit axial movement of the annular collar towards the end-fitting and locking the end-fitting to the annular collar with the locking means in order to prevent the end-fitting from moving axially with respect to the annular collar.

According to one embodiment of the second aspect, b) comprises winding tapes of composite material onto the exterior pipe surface to create the annular portion.

According to another embodiment of the second aspect, e) comprises removing a portion of the wound tapes to provide the stepped portion.

BRIEF DESCRIPTION OF THE DRAWINGS

The invention will now be further described, by way of example only, and with reference to the accompanying drawings, in which.

DETAILED DESCRIPTION

A detailed description of the invention will now be provided with reference to the above figures. A given reference number is always used to denote the same feature in each of the accompanying drawings.

Figure 1:
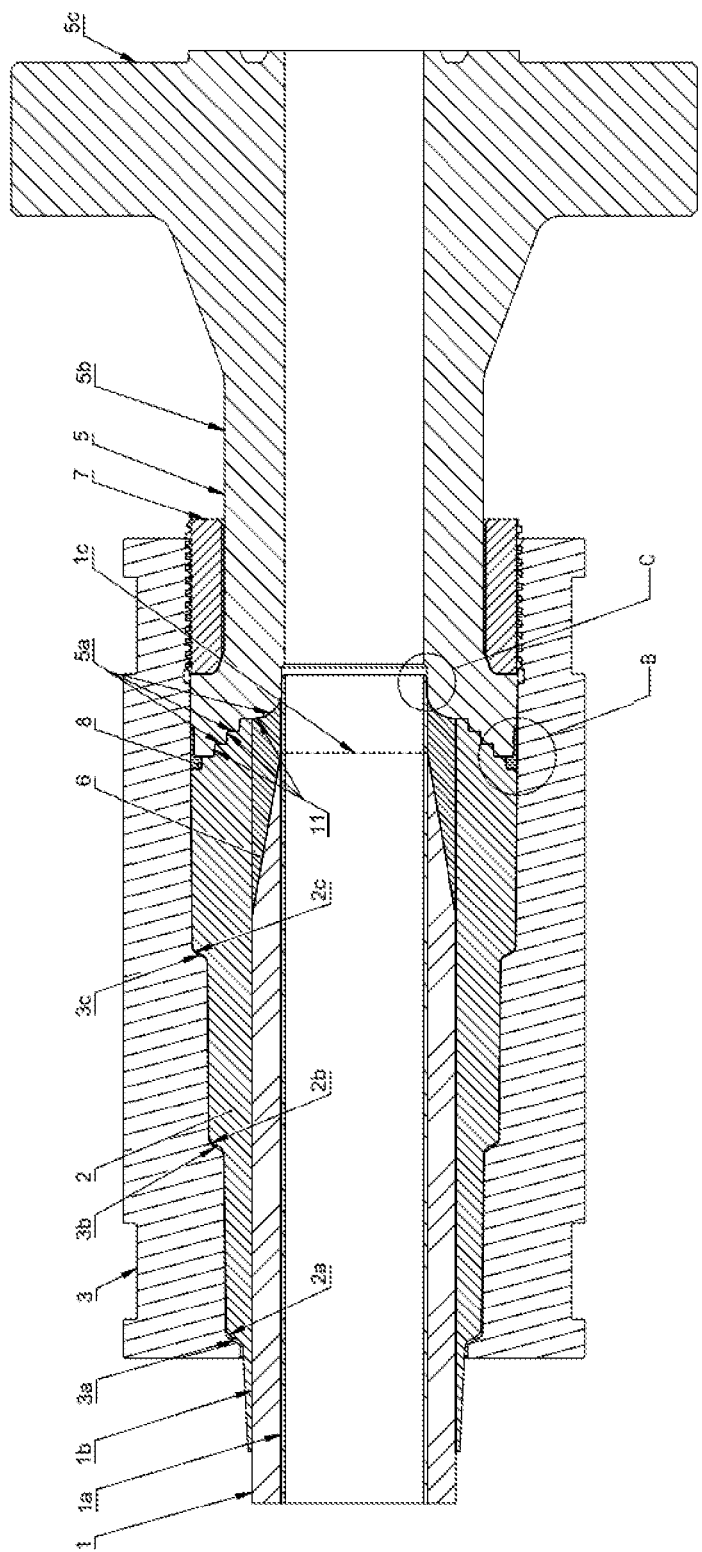
FIG. 1 shows a side-elevation of a composite pipe termination according to an embodiment of the invention.

FIG. 1 shows a side-elevation of a composite pipe termination according to an embodiment of the invention. Specifically, it shows a composite pipe 1 having an interior pipe surface 1a, an exterior pipe surface 1b and a pipe end 1c. A liner (shown in more detail in FIG. 3) is fused to the interior pipe surface.

Typically, the composite pipe consists of wound tapes of composite material which have been fused together. The composite material typically consists of a PEEK matrix and a plurality of continuous carbon fibres embedded therein. The tapes are typically wound onto a PEEK liner.

The pipe 1 comprises an annular portion 2, which itself comprises composite material. Typically, the annular portion is also manufactured by winding consecutive layers of tapes made of composite material, each layer being fused to the preceding one. The composite material typically consists of a PEEK matrix and a plurality of carbon fibres embedded therein.

The annular portion 2 is fused to the exterior pipe surface 1b and comprises a first stepped region in which the annular portion decreases in radial thickness in the axial direction away from the pipe end 1c by means of steps 2a, 2b and 2c. In this case, there are three steps, but the invention is not limited to three steps and the stepped region could comprise fewer than, or more than, three steps. The first stepped region is typically made by removing of a portion of the wound and fused PEEK tapes to form the steps 2a, 2b and 2c. Removal may be achieved by means of a lathe.

The composite pipe termination also comprises an annular collar 3 which encloses the stepped region. The annular collar comprises a stepped portion in which the annular collar increases in radial thickness in the axial direction away from the pipe end 1c by means of the same number of steps 3a, 3b, 3c as are comprised in the first stepped region. Step(s) of the stepped portion 3a, 3b, 3c mate with step(s) of the first stepped region 2a, 2b, 2c to prevent or limit axial movement of the annular collar 3 towards the end-fitting 5. Annular collar 3 is typically made of metal, preferably of steel.

As can be seen from FIG. 1, the annular portion 2 also comprises a second stepped region 11 in which the annular portion decreases in radial thickness in the axial direction towards the end-fitting by means of one or more steps. The second stepped region 11 terminates beyond the pipe end 1c. The second stepped region is typically made by removing of a portion of the wound and fused PEEK tapes to form the steps. Removal may be achieved by means of a lathe.

The end-fitting 5, shown in FIG. 1 comprises:
  a. a first interface 5a which sealingly engages with the second stepped region 11;
  b. a second interface 5c for interfacing with another apparatus, such as a pipe, or an end cap, and comprises a flange;
  c. an intermediate region 5b which connects the first interface 5a to the second interface 5c, wherein the intermediate region 5b has a diameter which is smaller than the diameter of the first interface 5a;
  d. wherein the first interface 5a comprises a stepped surface which increases in radial thickness in the axial direction towards the annular portion and comprises steps which mate with steps of the second stepped region 11.

End-fitting 5 is typically made of metal, preferably of steel.

Figure 4:
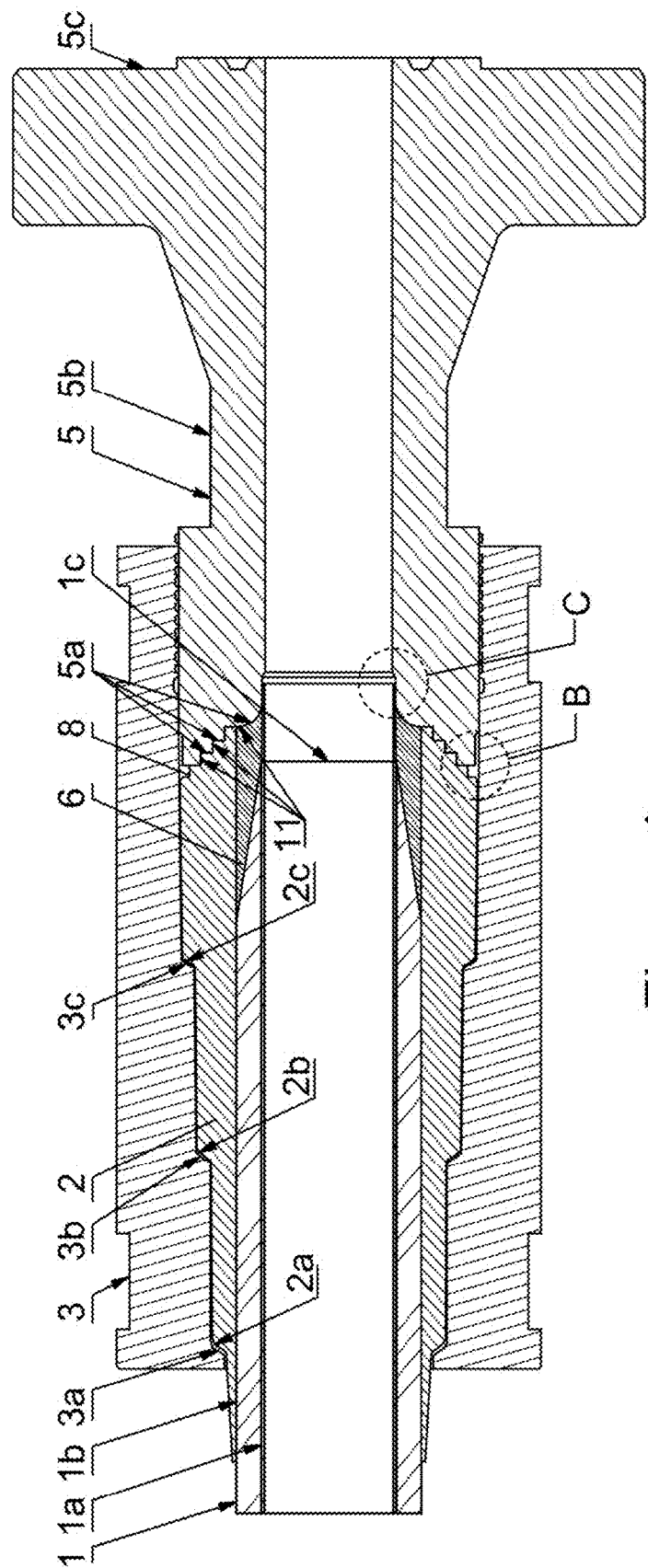
FIG. 4 shows a side-elevation of a composite pipe termination according to another embodiment of the invention.

The annular collar 3 of FIG. 1 comprises a locking portion which extends beyond the first interface, such that the locking portion overlaps part of the intermediate region and is radially spaced therefrom by an annular locking space. The locking portion comprises an inner surface which is provided with a female thread; the locking means comprises a locking ring 7 having an external surface provided with a male thread; and the male thread of the locking ring 7 engages with the female thread of the locking portion to lock the locking ring 7 within the annular locking space and prevent the end-fitting 5 from moving axially with respect to the annular collar 3. Locking ring 7 is typically made of metal, preferably of steel. Alternatively, it may be desirable to lock end-fitting 5 directly to the annular collar 3 by means of a threaded connection between the two, as shown in FIG. 4.

Figure 3:
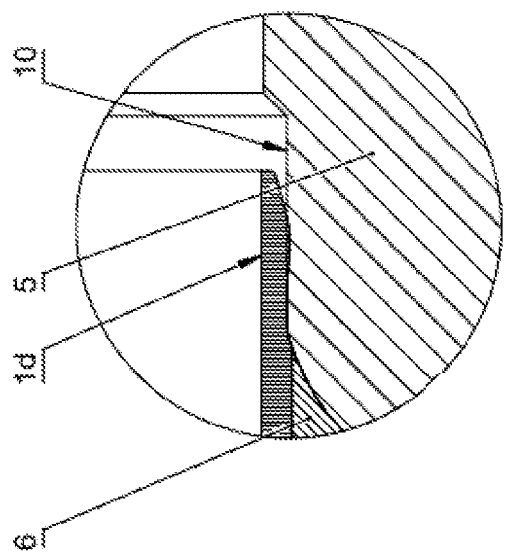
FIG. 3 shows expanded details of the composite pipe termination of FIG. 1 from detail view C.

The liner 1d comprises an extension portion which extends beyond the pipe end (shown in more detail in FIG. 3).

As can be seen in FIG. 1 a first sealing element (8) is provided between the second stepped region 11, the first interface 5a and the annular collar 3. Moreover, a second sealing element 6 is provided between the annular portion 2, the first interface 5a, the pipe end and the extension portion. Typically, the first and second sealing elements consist of PEEK.

Figure 2:
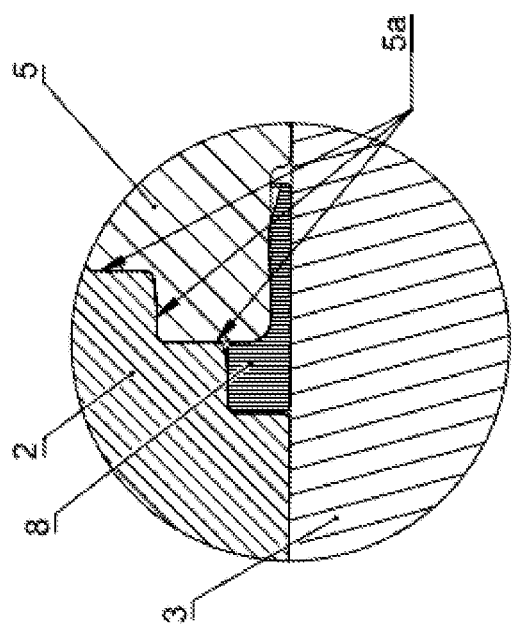
FIG. 2 shows expanded details of the composite pipe termination of FIG. 1 from detail view B.

FIG. 2 shows expanded details of the end-fitting of FIG. 1 from detail view B. An expanded view of first sealing element 8 which provides a seal between annular portion 2, first interface 5a of end-fitting 5 and annular collar 3.

FIG. 3 shows expanded details of the end-fitting shown in FIG. 1 taken from detail view C. In this figure, liner 1d is shown to have an extension portion, which is a portion of the liner which extends beyond the pipe end (the pipe end is located on the far left, out of this figure). First interface 5a of end-fitting 5 is shown in this figure to have a receiving portion 10 machined into it which receives part of the extension portion to form a lip seal. In use, the extension portion is pressed against the receiving portion 10 by the pressure of fluid flowing through the composite pipe termination to enhance the seal.

The invention claimed is:

1. A composite pipe termination comprising:
   a) a composite pipe formed of composite material and having an interior pipe surface, an exterior pipe surface and a pipe end, wherein composite material is a material comprising a polymer matrix and a plurality of reinforcing fibres embedded in the polymer matrix;
   b) a liner, wherein the interior pipe surface is fused to the liner;
   c) an annular portion of composite material attached to the exterior pipe surface, the annular portion comprising a first stepped region in which the annular portion decreases in radial thickness in the axial direction away from the pipe end by means of at least one step;
   d) an end-fitting which interfaces with the annular portion;
   e) an annular collar enclosing the first stepped region;
   f) locking means which lock the end-fitting to the annular collar to prevent the end-fitting from moving axially with respect to the annular collar;
   wherein the annular collar comprises a stepped portion in which the annular collar increases in radial thickness in the axial direction away from the pipe end by means of the same number of steps as are comprised in the first stepped region,
   wherein at least one step of the stepped portion mates with at least one step of the first stepped region to prevent or limit axial movement of the annular collar towards the end-fitting, and
   wherein the annular portion comprises a second stepped region in which the annular portion decreases in radial thickness in the axial direction towards the end-fitting by means of one or more steps.

2. The composite pipe termination of claim 1, wherein all the steps of the stepped portion mate with all the steps of the first stepped region to prevent or limit axial movement of the annular collar towards the end-fitting.

3. The composite pipe termination of claim 1, wherein the first stepped region and the stepped portion each comprises from 1 to 5 steps.

4. The composite pipe termination of claim 1, wherein the composite pipe has an internal diameter, and the at least one step has a dimension in the radial direction which is from 5% to 20% of the internal diameter of the composite pipe.

5. The composite pipe termination of claim 1, wherein the step or each step of the stepped region and the stepped portion is provided at an angle from 0 degrees to 45 degrees to a plane orthogonal to the axial direction.

6. The composite pipe termination of claim 1, wherein the second stepped region terminates beyond the pipe end.

7. The composite pipe termination of claim 1, wherein the end-fitting comprises: a. a first interface which sealingly engages with the second stepped region; b. a second interface for interfacing with another apparatus; c. an intermediate region which connects the first interface to the second interface, wherein the intermediate region has a diameter which is smaller than the diameter of the first interface; d. wherein the first interface comprises a stepped surface which increases in radial thickness in the axial direction towards the annular portion and comprises steps which mate with steps of the second stepped region.

8. The composite pipe termination of claim 7, wherein: a. the annular collar comprises a locking portion which extends beyond the first interface; b. the locking portion comprises an inner surface which is provided with a female thread; c. the end-fitting comprises an outer surface which is provided with a male thread; d. the male thread on the outer surface of the end-fitting engages with the female thread of the locking portion to lock the end-fitting to the annular collar and prevent the end-fitting from moving axially with respect to the annular collar.

9. The composite pipe termination of claim 7, wherein: a. the annular collar comprises a locking portion which extends beyond the first interface, such that the locking portion overlaps part of the intermediate region and is radially spaced therefrom by an annular locking space; b. the locking portion comprises an inner surface which is provided with a female thread; c. the locking means comprises a locking ring having an external surface provided with a male thread; and d. the male thread of the locking ring engages with the female thread of the locking portion to lock the locking ring within the annular locking space and prevent the end-fitting from moving axially with respect to the annular collar.

10. The composite pipe termination of claim 9, wherein the locking ring is made of steel.

11. The composite pipe termination of claim 7, wherein a first sealing element is provided between the second stepped region, the first interface and the annular collar.

12. The composite pipe termination of claim 7, wherein a second sealing element is provided between the annular portion, the first interface, the pipe end and the extension portion.

13. The composite pipe termination of claim 1, wherein the liner comprises an extension portion which extends beyond the pipe end.

14. The composite pipe termination of claim 13, wherein the end-fitting comprises a receiving portion formed to receive a portion of the extension portion and form a lip seal, wherein, in use, the lip seal is pressed against the receiving portion by the pressure of fluid contained within the pipe termination to enhance the seal.

15. The composite pipe termination of claim 1, wherein the end fitting comprises a flange.

16. The composite pipe termination of claim 1, wherein the annular portion consists of a composite material which is the same as the composite material of which the composite pipe consists.

\* \* \* \* \*